(12) United States Patent
Cedilnik (10) Patent No.: US 10,935,418 B2
(45) Date of Patent: Mar. 2, 2021

(54) HIGH-RATE FIBER-OPTICAL DISTRIBUTED ACOUSTIC SENSING

(71) Applicant: AP Sensing GmbH, Böblingen (DE)

(72) Inventor: Gregor Cedilnik, Gaeufelden (DE)

(73) Assignee: AP Sensing GmbH, Böblingen (DE)

( * ) Notice: Subject to any disclaimer, the term of this patent is extended or adjusted under 35 U.S.C. 154(b) by 203 days.

(21) Appl. No.: 16/246,161

(22) Filed: Jan. 11, 2019

(65) Prior Publication Data
US 2019/0219441 A1 Jul. 18, 2019

(30) Foreign Application Priority Data

Jan. 12, 2018 (GB) ...................................... 1800532

(51) Int. Cl.
*G01H 9/00* (2006.01)
*G01D 5/353* (2006.01)

(52) U.S. Cl.
CPC ........... *G01H 9/004* (2013.01); *G01D 5/3539* (2013.01); *G01D 5/35316* (2013.01); *G01D 5/35361* (2013.01)

(58) Field of Classification Search
None
See application file for complete search history.

(56) References Cited

U.S. PATENT DOCUMENTS

| 5,757,487 A | 5/1998 | Kersey |
| 6,285,806 B1 | 9/2001 | Kersey et al. |
| 2014/0152995 A1 | 6/2014 | Dong et al. |
| 2015/0285683 A1* | 10/2015 | Ouellette ........... G01D 5/35383 356/451 |
| 2016/0320232 A1 | 11/2016 | Nunes et al. |
| 2018/0013387 A1* | 1/2018 | Fells ...................... G01D 5/353 |

FOREIGN PATENT DOCUMENTS

| EP | 1 912 049 A1 | 4/2008 |
| GB | 2534904 A | 8/2016 |
| WO | WO 8902067 A1 | 3/1989 |
| WO | WO 2011149613 A2 | 12/2011 |

(Continued)

OTHER PUBLICATIONS

European Patent Office, Extended European Search Report; Application No. 19151469.4; dated Apr. 18, 2019, 11 pp.; Munich, Germany.

*Primary Examiner* — Chad H Smith
(74) *Attorney, Agent, or Firm* — Robert A. Blaha; Smith Tempel Blaha LLC (57) ABSTRACT

A method of high rate fiber optical distributed acoustic sensing includes injecting a first coherent light pattern comprising first light into an optical cable, the optical cable having at least a first reflector pair and a second reflector pair arranged at different positions along the optical cable; injecting a second coherent light pattern comprising second light into the optical cable while first backscatter light of the first light pattern is propagating in the optical cable; detecting first reflected light originating from reflection of the first light pattern from the first reflector pair and/or the second reflector pair; and, at a different interval in time: detecting second reflected light originating from reflection of the second light pattern from the first reflector pair and/or the second reflector pair.

14 Claims, 6 Drawing Sheets

(56) References Cited

FOREIGN PATENT DOCUMENTS

| | | |
|---|---|---|
| WO | WO 2013131085 A1 | 9/2013 |
| WO | WO 2016000063 A1 | 1/2016 |
| WO | WO 2016142695 A1 | 9/2016 |
| WO | WO 2017037453 A1 | 3/2017 |
| WO | WO 2017087792 A1 | 5/2017 |

* cited by examiner

HIGH-RATE FIBER-OPTICAL DISTRIBUTED ACOUSTIC SENSING

TECHNICAL FIELD

The present invention relates to a method and arrangement for high rate fiber-optical distributed acoustic sensing and further relates to an optical cable configured for usage in the method and included in the arrangement.

TECHNOLOGICAL BACKGROUND

In conventional distributed acoustic sensing pulses of light are injected into an optical fiber, wherein backscatter along the optical fiber changes in dependence of strain/stress/temperature/acoustic disturbance. The backscattered light is detected and analyzed to determine strain/stress/acoustic disturbance at different positions along the optical fiber in dependence of time.

U.S. Pat. No. 5,757,487 discloses an optical fiber including a plurality of Bragg gratings which weakly reflective and act as sensors, wherein a pair of wavelengths is used and reflectivity measurements are made on either side of the nominal center Bragg wavelength.

WO 2013131085 discloses a broad band light source used to generate a series of pulses that are fed into an array of sensor gratings, wherein a series of output pulses are generated in which each output pulse comprises a reflection of the input pulse at a respective grating in the sensor array.

US 2014152995 discloses a serial arrangement of weak reflective fiber Bragg gratings (FBGs) used as an extrinsic Fabry-Perot interferometer with a sensor length in between a series of FGB.

WO 8902067 discloses optical fiber sensors defined by an optical fiber provided along its length with a plurality of spaced partially reflective discontinuities which effectively divide the optical fiber into a plurality of discrete optical fiber sensing elements.

WO 2011149613 discloses a fully distributed fiber optic vibration sensor and an array of discrete reflectors in the fiber, wherein the fiber section between adjacent pairs of reflectors then becomes a low reflectivity Fabry-Perot etalon and the fiber.

WO 2016142695 teaches the use of equidistantly spaced reflector points in order to increase the signal to noise ratio.

U.S. Pat. No. 6,285,806 discloses fiber optic sensor array with multiple segments, each capable of detecting a physical condition such as an acoustic wave, wherein the segments are separated by weak reflectors such as fiber optic Bragg gratings.

WO 2017037453 discloses an apparatus to monitor a distributed optical fiber sensor based on OTDR (optical time domain reflectometry) technology, wherein a second interrogation (with the same optical properties as a first interrogation) cannot be launched into the fiber until light from the first interrogation has reached the distal end of the fiber and then any backscatter has travelled the entire length of the fiber back toward the detector and has been detected.

For conventional distributed acoustic sensing (DAS) sensors there are trade-offs between acoustic bandwidths and fiber lengths.

WO 2017037453 discloses an apparatus with an optical generator for repeatedly generating a first coded sequence of light to be launched into a sensing optical fiber.

US 2016320232 discloses a fiber optic distributed acoustic sensor (DAS) that uses a continuous-wave fiber optic distributed acoustic sensor with a very small spatial sampling while being able to sense acoustic events that have a large bandwidth, thereby using of a demodulation/decoding method utilizing multiple spread-spectrum codes.

EP 1912049 (A1) discloses an alternative technique for fiber optic acoustic sensing, wherein a light source launches a plurality of groups of pulses into a optical fiber sensor, whereas the frequency of electromagnetic waves in a pulse differs from the frequency of the electromagnetic waves in another pulse within the group.

The systems of the prior art provide only a limited acoustic bandwidth, thus a limited sampling rate (a limited number of samplings per time) of the strain/stress/acoustic disturbance of the optical fiber. In particular, in the conventional systems, the acoustic bandwidth (for example given by the rate of sending light patterns into the optical fiber) is limited by the given fiber length. In the conventional systems, after a first pulse or light pattern has been injected into the optical fiber, a waiting time is required, until backscattered light of the first light pattern has left the optical fiber, before a next light pattern or light pulse can be injected. Thereby, the detection rate or acoustic bandwidth is restricted.

However, there are applications that require ultra-sonic detection even on long distance. A conventional manner to increase the bandwidth is to send "labelled" pulses into the optical fiber, where the backscatter from one type of pulse can be distinguished from backscatter from another type of pulse having a different "label", allowing to have more than one pulse or more than one pattern propagating inside the optical fiber. Labelling may include using different wavelengths that can be separated on the detector side by appropriate filters or it may include frequency shifting of the light frequency, allowing separation on a detector side engaging heterodyne techniques or might also include using different polarizations and performing polarization dependent detection. All these prior art solutions add complexity and costs to the system.

FBG systems require a broadband or wavelength tunable light source, where shifts of the reflection spectra due to strain induced along the FBG-length are analyzed. The FBGs can be "labelled" by having different spectra (also called wavelength division multiplexing). Such labelled FBGs may be interrogated even with continuous wave or continuous waveform (CW) light, where the labelling allows to separate the signals from different FBGs by their spectrum and this way allowing monitoring without pulse propagation time (pulse period) limitations. However, also these systems are very complex and expensive.

Thus, there may a need for a fiber optical distributed acoustic sensing method and arrangement, where the sampling rate or acoustic bandwidth is increased compared to the prior art requiring minimal modifications with low complexity and low need for additional components. In particular, it is an object of the present invention to increase the acoustic bandwidth on a given sensor of fiber length at selected locations. Further, there may be a need for an optical cable which is configured to act as a sensing fiber for the method and the arrangement.

SUMMARY

According to an embodiment of the present invention a method of high rate fiber optical distributed acoustic (DAS) sensing is provided. The method includes injecting a first coherent light pattern comprising first light into an optical cable, the optical cable having at least a first reflector pair and a second reflector pair arranged at different positions along the optical cable; injecting a second coherent light pattern, comprising second light into the optical cable while first backscatter light (e.g. due to Rayleigh scattering occurring at any position along the fiber) of the first light pattern is propagating in the optical cable; detecting first reflected light originating from reflection of the first light pattern from the first reflector pair and/or the second reflector pair; and, at a different interval in time: detecting second reflected light originating from reflection of the second light pattern from the first reflector pair and/or the second reflector pair.

The second light may or may not have substantially similar characteristics as the first light. The first reflected light and/or the second reflected light may be detected in a light characteristic dependent or in a light characteristic independent fashion, thus taking the respective light characteristic into account or not into account. For carrying out the method, it may not be necessary that the first and second light have different characteristics, they may have similar or (substantially) the same or even identical characteristics. For carrying out the method, it may not be necessary to detect the first and second reflected light in a light characteristic dependent (sensitive) manner, the detection of both the first and second reflected light may be insensitive to any difference of light characteristic or may disregard any difference of light characteristic, if present at all.

However, the detection of one or both the first reflected light and the second reflected light may be sensitive to a phase of the received light, in particular, the detection and/or the analysis of one or both the first or second reflected light may determine the phase of the corresponding received light.

Furthermore, any analyzing/processing of the received first and second reflected light (e.g. to detect strain/stress/acoustic disturbance, see below) may disregard a difference (if present at all) of light characteristics (even if a difference of light characteristics should have been detected).

A time interval in which both the first reflected light (or even a complete first reflected pattern) and the second reflected light (or even a complete second reflected pattern) arrive at the detector or are detected by the detector may not exist. The first reflected light (or even a complete first reflected pattern) may arrive at the detector or may be detected by the detector either entirely before or entirely after the second reflected light (or even a complete second reflected pattern) arrive at the detector or is detected by the detector (no intercalated arrivals/detection).

An arrangement for high rate fiber optical distributed acoustic sensing includes an optical cable, a light coupler and a light detector. The light coupler is configured to inject a first coherent light pattern comprising first light into the optical cable, the optical cable having at least a first reflector pair and a second reflector pair arranged at different positions along the optical cable. The light coupler further configured to inject a second coherent light pattern comprising second light into the optical cable while at least a portion of first backscatter light of the first light pattern is propagating in the optical cable. The detector is adapted to detect first reflected light originating from reflection of the first light pattern from at least one of the first reflector pair and the second reflector pair; and, at a different interval in time further adapted to detect second reflected light originating from reflection of the second light pattern from at least one of the first reflector pair and the second reflector pair.

An optical cable includes at least one fiber adapted to guide light and at least two reflector pairs arranged at different positions along the optical cable, each reflector pair having two reflectors. A reflector intra-distance between the reflectors of at least one reflector pair is different from a reflector pair distance between a reflector pair and a next reflector pair of the at least two reflector pairs. Furthermore, between reflectors of each reflector pair and between neighboring reflector pairs the fiber has a refractive index being essentially homogeneous at least along a longitudinal direction of the fiber.

A method of fiber optical distributed acoustic sensing includes switching between a high rate fiber optical distributed acoustic sensing and a low rate fiber optical distributed acoustic sensing where the high rate fiber optical distributed acoustic sensing includes injecting a first coherent light pattern with first light into an optical cable, the optical cable having at least a first reflector pair and a second reflector pair arranged at different positions along the optical cable and injecting a second coherent light pattern with second light into the optical cable while first backscatter light of the first light pattern is propagating in the optical cable, detecting first reflected light originating from reflection of the first light pattern from at least one of the first reflector pair and the second reflector pair; and, at a different interval in time detecting second reflected light originating from reflection of the second light pattern from at least one of the first reflector pair and the second reflector pair. The low rate fiber optical distributed acoustic sensing includes injecting another first light pattern into the optical cable, detecting light originating from Rayleigh backscattering of the other first light pattern from different portions along the optical cable including at least one portion between reflector pairs, injecting another second light pattern into the optical cable after all the other first light pattern backscattered from all portions of the optical fiber has left the optical cable, and detecting light originating from Rayleigh backscattering of the other second light pattern from different portions along the optical cable including the at least one portion between reflector pairs.

Applications and Architectures

In conventional methods involving two differently labeled light pulses, the reflected light pulses are detected simultaneously.

The first light pattern (e.g. intensity profile over time, number of pulses, pulse shape etc.) may be (substantially) the same as or different from the second light pattern. The first and the second coherent light pattern may be generated by a (same) single laser (or two different light sources) followed by an amplitude modulator. The method may be compatible with a number of different distributed acoustic sensing architectures, such as intensity-DAS, local oscillator DAS or double pulse DAS.

For intensity-DAS, the first and second light pattern may comprise a single pulse whose width may be greater than the intra-distance between the two reflectors of each reflector pair. The single pulse reflected by both reflectors of a considered reflector pair interferes, wherein the intensity changes with the distance (in particular optical path length) between both detectors. The intensity change is detected by the detector and is indicative for acoustic disturbance/stress/strain in the region between the considered reflector pair.

In local oscillator DAS, the first and the second light patterns may comprise a single light pulse having a width which may be smaller than the intra-distance between two reflectors of each reflector pair. Due to reflection of the single pulse on both reflectors of each reflector pair, two reflected light pulses are generated having different phases depending on the intra-distance (in particular optical path length) of the reflectors of the considered reflector pair. The reflected pulses are interfered with a reference light to detect their phases and thereby also their phase difference. The determined phase difference is indicative of the strain/stress/ acoustic disturbance in the region between the reflectors of the reflector pair.

In double pulse DAS, the first and second light patterns may comprise each a double pulse comprising two pulses comprised of light having different wavelengths. Both backscattering light may form an interference beat, wherein its phase may change with the distance (in particular optical path length) between both reflectors of the considered reflector pair.

All these distributed acoustic sensing architectures are supported by the method and may be carried out by the claimed arrangement for high rate distributed acoustic sensing.

Light in different portions of the coherent light pattern has a known fixed phase relationship. The first reflector pair may be arranged in the optical cable where monitoring stress/ strain/acoustic disturbance is desired. The method may provide high rate (high acoustic bandwidth, high sampling rate) acoustic monitoring of the regions of the optical fiber between the reflectors of each reflector pair in the optical fiber. The optical fiber may comprise for example 2 to 5, 5 to 10, 5 to 20, or 20 to 100 reflector pairs or even a higher number of reflector pairs, for monitoring a high number of monitoring sites as required by the particular application. The reflectance of the reflectors for the used light may be between 0.05% and for example 5%, in particular between 0.1% and 0.5%, in particular around 0.2%. An intra-distance (e.g. d) between reflectors of one reflector pair may be smaller than a reflector pair distance (e.g. D) between different reflector pairs of adjacent reflector pairs and may in particular be smaller than half of the smallest reflector pair distance. Thus, it may hold: D>2*d, or D>4*d, or D>10*d. The first light and the second light may have substantially similar or the same wavelength and substantially similar or the same polarization, thus are not "labelled" differently.

The first backscatter light may be due to Rayleigh backscattering as utilized in conventional DAS procedures. The first backscatter light may be present within the optical fiber from the time point on when the first light pattern is injected until the complete first light pattern has been reflected from the end of the optical cable and has returned to the begin or entry point of the optical cable which takes two times the length of the optical cable divided by the speed of light in the optical cable. The second coherent light pattern is however injected before all first backscatter light due to backscattering of the first light pattern has exited the optical cable. Thereby, the monitoring rate may considerably be increased.

At least a portion (or all) of first reflected light originating from reflection of the first light from the first reflector pair and/or the second reflector pair may not reach the detector at the same time as the second reflected light (or at least a portion therefrom) originating from reflection of the second light from the first reflector pair and/or the second reflector pair reaches the detector. In other embodiments, all first reflected light is received at the detector at a time interval different from the reception time interval where all second reflected light is received at the detector. Thus, a first reflected light pattern including all first reflected light originating from reflection of the first light pattern from (both reflectors of) the first reflector pair and/or the second reflector pair may be received and detected by the detector, while none of the second reflected light originating from the reflection of the second light from (both reflectors of) the first reflector pair and/or the second reflector pair receives the detector.

In particular, the first reflected light may originate from reflection of the first light from the second reflector pair and the second reflected light may originate from reflection of the second light from the first reflector pair. The first reflected light may be detected (e.g. received by the detector) prior or after detection of the second reflected light.

Overview of Embodiments

According to an embodiment of the present invention, distributed acoustic sensing is performed by sending coherent light patterns (for example single pulses or double pulses) into the optical fiber and analyzing the returning signal, wherein multiple reflector pairs are located along the optical fiber and vibration between both reflectors of a respective reflector pair are individually detected. Several light patterns may propagate simultaneously within the optical fiber, wherein the mutual distance between the light patterns and the mutual distance or mutual spacing of the reflector pairs is chosen in a way so that the returning signal reaching the detector at a time is from only one reflector or reflector pair. In particular, the returning signal may be from only one reflector of a considered reflector pair at a time for a particular DAS architecture, especially if the light pattern is shorter than the pair size (e.g. the width of the light pattern is smaller than the intra-reflector distance of a reflector pair). The returning signal may be from the backscatter from both reflectors of a considered time at a time for some other architecture.

In the special case of equidistant reflector pairs, there may be a difference between pulse period and reflector pair period (leading to sampling with Moiré effect or Alias effect). According to embodiments of the present invention, the detector receives over time (during propagation of the pulses) the return signal from different reflectors in a sequence (not necessarily the order of arrangement along the fiber).

The intra-distance between reflectors of one considered reflector pair may be between for example 0.1 m to 50 m, in particular between 1 m and 20 m, in particular around 10 m or may be shorter or greater. The high rate DAS may monitor vibrations/strain/acoustic disturbances in the sections between reflectors of all reflector pairs in the optical fiber, but may not monitor the regions between reflector pairs. Thus, in the high rate operation mode, Rayleigh scattering in the fiber which always occurs may be ignored or might not be detectable or present in the noise range, since it is much weaker than the reflector's reflection and may cause a background noise.

Embodiments of the present invention may allow a higher rate (smaller time between launching the first light pattern and launching the second light pattern) which may be much higher than in a conventional DAS method in which after a light pattern is launched into the fiber it is waited until the pattern reaches the optical sensor end and the backscatter reaches back to the detector before sending the next pulse. Thus, in the conventional DAS method, only one light pattern at a time is in the optical fiber. During the high rate operation mode, monitoring regarding strain/stress/acoustic disturbance may be limited to the selected locations of interest, i.e. between reflectors of all reflector pairs.

According to an embodiment of the present invention, the first light pattern and the second light pattern are injected according to a forward direction, wherein the first backscatter light, the first reflected light and the second reflected light propagate according to a backward direction being opposite to the forward direction. The first backscatter light will be present invention within the optical fiber beginning when the first light pattern is injected into the fiber and ending when the complete first light pattern has travelled all along the optical fiber until the end of the optical fiber, has been reflected from the end of the optical fiber and has, in the backward direction, propagated through the entire optical fiber and has entirely exited from the optical fiber which takes the time two times the length (e.g. l) of the optical fiber divided by the speed of light (e.g. c) in the optical fiber. The second coherent light pattern may be injected less than 2×l/c after the launch time of the first light pattern, wherein l denotes the length of the optical fiber and c denotes the speed of light in the optical fiber, i.e. the vacuum speed of light divided by the (overall) refractive index of the optical fiber for the considered wavelength of the first light and the second light.

According to an embodiment of the present invention, the first light pattern (e.g. a center thereof) is injected substantially at a first point in time, wherein the second light pattern (e.g. a center thereof) is injected substantially at a second point in time later than the first point in time, wherein a reflector pair distance between the first reflector pair and the second reflector pair is different from, in particular smaller or greater than, a difference between the second point in time and the first point in time multiplied by half of the speed of light in the optical cable.

The reflector pair distance may for example be defined as a distance between a center between a first reflector and a second reflector of the first reflector pair and a center between a first reflector and a second reflector of the second reflector pair. Alternatively, the reflector pair distance may be defined as the distance between a first (or second) reflector of the first reflector pair and a first (or second) reflector of the second reflector pair. The reflector pair distance may be greater or smaller than the difference between the second point in time and the first point in time multiplied by half of the speed of light in the optical cable. Thus, even though the second light pattern is injected after the first light pattern has been injected, firstly the second reflected light (in particular originating from reflection of the second light from the first reflector pair) may be detected by the detector before detecting the first reflected light (in particular originating from reflection of the first light pattern from the second reflector pair). Thereby, the first reflected light and the second reflected light may be detected separately from each other in particular not in an overlapped manner for improving the monitoring method.

According to an embodiment of the present invention, a first reflected pattern originating from reflection of the first light pattern from the reflectors of the second reflector pair and/or the first reflector pair is received at the detector during a first reception time interval, a second reflected pattern originating from reflection of the second light pattern from the reflectors of the first reflector pair and/or the second reflector pair is received at the detector during a second reception time interval, wherein the first reception time interval does not overlap with the second reception time interval.

The first light pattern as well as the second light pattern may have a particular first pattern width and second pattern width, respectively. Further, the first reflected pattern as well as the second reflected pattern may also have a first reflected pattern width and a second reflected pattern width which may depend on the first/second pattern width, intra-distances between reflectors of the first/second reflector pair and also the first/second reflector pair positions. The first reception time interval and also the second reception time interval may therefore be calculated depending on the different pattern parameters, the position of the reflector pair and the intra-distance between reflectors of the reflector pair. The parameters may be adjusted such that the first reception time interval does not overlap with the second reception time interval. Therefore, the reflected light from the first light pattern and the second light pattern due to reflection at the first and/or the second reflector pairs is received at the detector in different time intervals, thereby separated from each other.

According to an embodiment of the present invention, the second light having substantially same characteristic as the first light comprises: the first light and the second light have same (or identical) wavelength or wavelength range (or at least overlapping wavelengths or wavelength ranges) and/or the first light and the second light have same polarization state. Thus, a labelling of the different light patterns (or separate, light characteristic sensitive, detection and/or analysis of differently labelled reflected first and second light) is not required according to embodiments of the present invention. Other embodiments apply a labelling, such as applied for the first light and the second light different wavelengths and/or different polarization states. Thereby, the rate may even further be increased.

According to an embodiment of the present invention, the first light pattern and the second light pattern have substantially a same width and/or amplitude and/or intensity profile, in particular each comprising a single pulse or a double pulse. In general, a light pattern may define over a particular duration an intensity profile of the first light including variations of the intensity of the light during the duration. According to particular embodiments of the present invention, the first light pattern as well as the second light pattern comprises a single pulse or a double pulse. Thereby, one pulse is considered to comprise a (single) intensity peak having a particular time pulse width (the duration during which the intensity is above zero). The pulses may have any shape, such as a Gaussian shape, a rectangular shape, a triangle shape or the like. A single pulse or a double pulse may easily be generated by available optical equipment. The pulse width and/or the duration of the double pulse may be smaller or greater than the intra-distance between reflectors of one reflector pair. Thereby, different variants of DAS are supported.

According to an embodiment of the present invention, the method further comprises injecting the first and second light patterns in a periodic fashion as a periodically repetitive light pattern such that, at any time, a reflected pattern originating from reflection from at most one reflector pair is received at the detector. The scheduling or timing of adjacent light patterns injected in a periodic fashion may be analogous to the timing/scheduling of the first coherent light pattern and the second coherent light pattern as explained above. Thus, it may be ensured that respective reflected light originating from reflection of a particular launched light pattern is performed timely separated from the detection of any other reflected light originating from the reflection of any other light pattern launched into the optical fiber. Thereby, a time resolved monitoring may be achieved.

According to an embodiment of the present invention, the method further comprises analyzing the detected light, to determine strain and/or stress and/or acoustic disturbance and/or temperature in a first region of the optical fiber between the reflectors of the first reflector pair and in a second region of the optical fiber between the reflectors of the second reflector pair. A respective arrangement may therefore comprise an analyzer or a signal processing module which may be configured in hardware and/or software. Detecting the light may also involve (depending on the DAS architecture) interfering the reflected light with reference light, for example to determine phases of the reflected light. The optical fiber may be arranged close to an installation or equipment to be monitored. The optical fiber may be provided with a number of reflector pairs close to regions to be monitored for strain/stress/acoustic disturbance.

According to an embodiment of the present invention, the method may further comprise switching between a high rate fiber optical distributed acoustic sensing according to one of the preceding embodiments and a low rate fiber optical distributed acoustic sensing, the low rate fiber optical distributed acoustic sensing comprising: injecting another first light pattern into the optical cable; detecting light originating from Rayleigh backscattering of the other first light pattern from different portions along the optical cable including at least one portion between reflector pairs; injecting another second light pattern into the optical cable after all the other first light pattern backscattered from all portions of the optical fiber has left the optical cable; detecting light originating from Rayleigh backscattering of the other second light pattern from different portions along the optical cable including the at least one portion between reflector pairs.

Both modes may utilize a same light source, a same detector, same light couplers, so substantially the same hardware. However, the light source may be differently controlled in the two modes and the analysis of detected light may be different.

The other first light pattern may be same as or different from the first light pattern and/or the other second light pattern may be same as or different from the second light pattern. Thus, the combined provision of two different operation modes achieves synergetic effects.

During the high rate fiber optical distributed acoustic sensing, the regions between reflectors of all reflector pairs may be monitored with a high rate, while during the low rate fiber optical distributed acoustic sensing, the entire optical fiber and the environment of the entire optical fiber may be monitored, however, having a lower acoustic bandwidth than during the high rate operational mode. Thereby, the method may switch to a conventional DAS monitoring method. Thereby, a combination of high rate monitoring and particular regions and low rate monitoring across the whole fiber may be provided.

It should be understood that features, individually or in any combination, disclosed, described, explained or provided for a method of fiber optical distributed acoustic sensing may also be applied or provided for an arrangement for high rate fiber optical distributed acoustic sensing, individually or in any combination, according to embodiments of the present invention and vice versa.

According to an embodiment of the present invention it is provided an arrangement for high rate fiber optical distributed acoustic sensing, the arrangement comprising: a light coupler configured: to inject a first coherent light pattern comprising first light into an optical cable, the optical cable having at least a first reflector pair and a second reflector pair arranged at different positions along the optical cable, to inject a second coherent light pattern comprising second light into the optical cable while at least a portion of first backscatter light of the first light pattern is propagating in the optical cable; a detector adapted: to detect first reflected light originating from reflection of the first light pattern from the first reflector pair and/or the second reflector pair; and, at a different interval in time: to detect second reflected light originating from reflection of the second light pattern from the first reflector pair and/or the second reflector pair.

The arrangement may comprise a (e.g. single) light source, such as a laser for generating coherent light, in particular having a particular wavelength. The arrangement may also comprise one or more couplers for coupling the light into the fiber or splitting the light in light to be launched into the fiber and reference light later to be interfered with returning reflected light from the fiber. The arrangement may further comprise an amplitude modulator for modulating the intensity of the laser for generating a desired light pattern. The detector may comprise one or more light sensitive elements, such as photodiodes, CMOS detection elements or the like.

According to an embodiment of the present invention it is provided an optical cable, comprising: at least one optical fiber adapted to guide light; at least two reflector pairs arranged at different positions along the optical cable, each reflector pair comprising two reflectors; wherein a reflector intra-distance (e.g. d) between the reflectors of at least one reflector pair is different from a reflector pair distance (e.g. D) between a reflector pair and a next reflector pair of the at least two reflector pairs, wherein between reflectors of each reflector pair and between neighboring reflector pairs the fiber has a refractive index being essentially homogeneous at least along a longitudinal direction of the fiber and/or wherein between reflectors of each reflector pair and between neighboring reflector pairs the fiber has at most reflectors for reflection from the forward direction to the backward direction having reflectivity smaller than 0.1 to 0.01 or smaller than 0.01 or smaller than 0.001 times a smallest reflectivity of the reflectors of the reflector pairs.

The optical cable may comprise different layers surrounding a core optical fiber which is adapted to guide light. In particular, the optical cable may have a core optical fiber (for example having a diameter between 100 µm and 300 µm) having a higher refractive index than a cladding having a lower refractive index for allowing internal total reflection of the light. The cable may further comprise one or more protection layers. The reflector pairs may be arranged within the core optical fiber or may in other embodiments be arranged in one or more outer (e.g. cladding) layers. According to one embodiment, the optical cable does not comprise a cladding nor a protection nor an isolation layer but merely the optical fiber having the reflector pairs arranged therein internally. The refractive index of the optical fiber or in general the optical cable may change in a radial direction from a center of the optical fiber, in particular decreasing from a center radially outwards. In a central core of the optical fiber, however, the refractive index is essentially homogeneous (does not change considerably) at least along the longitudinal direction. Thus, beside the reflectors of the reflector pairs, there are no reflectors reflecting in the forward and backward direction which have reflectivity greater than 0.1 or greater than 0.01 for example. According to an embodiment of the present invention, none of the reflectors of the reflector pairs is configured as a Fiber Bragg grating (FBG).

According to an embodiment of the present invention, positions of the reflector pairs are defined according to the following procedure: defining a number of sections of the optical fiber adjacent to/abutting to each other and spanning the length of the optical fiber; defining, within each section, plural adjacent subsections spanning the entire section and being indexed for all sections with labels being unique for each relative position of the respective subsection within each section, the number of subsections being equal to the number of sections; defining plural positions of the reflector pairs, the number of positions being equal to the number of sections, such that in any section a subsection with a particular label is occupied at most once.

A light pattern sequence (e.g. a sequence of, in particular periodic, light patterns) may have been previously determined or defined. The light pattern sequence may for example be a periodic pattern sequence having equidistant pulses. The number of reflector pairs to be positioned may be equal to the number of pulses of the sequence which fit into the optical cable which may be determined by dividing the length of the cable by the distance between adjacent patterns of the light pattern sequence. Further, the light pattern widths may have been predetermined and may be constant in the light pattern sequence. Each of the sections may be defined as the region between a light pattern and an adjacent light pattern at a fixed time. Each subsection may have a width which may be equal or smaller than the width of each light pattern of the light pattern sequence. According to an embodiment of the present invention, the method may be reversed by first defining the positions of the reflector pairs and then defining the light pattern sequence such that separate high rate monitoring of all predetermined positions is achievable.

According to an embodiment of the present invention, a reflector is realized by providing a refractive index change in the fiber at the reflector position, wherein, in particular, the refractive index is, over the region of the reflector, higher or lower than an overall refractive index of the fiber, wherein outside the region of each reflector the fiber has the overall refractive index.

According to an embodiment of the present invention, a reflector is in particular realized by at least one of the following methods including: introducing at least one impurity, performing a doping of a scattering particle and/or a reflective particle, applying UV-radiation, applying melting, applying radiation pattern treatment, modifying the structure, generating at least one cutting edge, providing an air gap, applying a connector to connected two portions of the fiber, apply a coating, apply a coated connector.

Further, the arrangement for high rate DAS may comprise an optical cable as explained in one of the above described embodiments and may also be capable to carry out a method of high rate DAS according to an embodiment as described above.

According to an embodiment of the present invention, the time for the light to travel from first reflector pair to the second reflector pair and back to the first reflector pair is different from the difference between the second point in time and the first point in time.

According to an embodiment of the present invention, the detecting comprises: in a first operation mode (e.g. intensity DAS mode): detecting an intensity of interfered light reflected from both reflectors of the first reflector pair and, at a different time, detecting an intensity of interfered light reflected from both reflectors of the second reflector pair, wherein a pattern width of the first and second light pattern is greater than the intra-reflector distance of every reflector pair, or in a second operation mode (e.g. local oscillator DAS): detecting an intensity of light reflected from one of the reflectors of the first reflector pair and interfered with reference light, detecting an intensity of light reflected from the other of the reflectors of the first reflector pair and interfered with reference light; at a different time: detecting an intensity of light reflected from one of the reflectors of the second reflector pair and interfered with reference light, detecting an intensity of light reflected from the other of the reflectors of the second reflector pair and interfered with reference light, wherein a pattern width of the first and second light patterns is smaller than a reflector intra-distance of both the first and second reflector pair. Thereby, multiple DAS architectures are supported.

According an embodiment of the present invention, the changed refractive index region has an extension along the longitudinal direction of the fiber less than the intra-distance (e.g. d) of a reflector pair.

According an embodiment of the present invention, the optical cable comprises reflector pairs arranged in a way that the backreflections from various patterns simultaneously in the fiber form different reflector pairs arrive at different times at the detector.

According an embodiment of the present invention, at least three reflector pairs comprise a first reflector pair, a second reflector pair next to the first reflector pair, and a third reflector pair next to the second reflector pair, wherein a reflector pair distance between the first and the second reflector pair is different from another reflector pair distance between the second and the third reflector pair.

According to an embodiment of the present invention, a first reflector distance between reflectors of the first reflector pair is different from a second reflector distance between reflectors of the second reflector pair.

According an embodiment of the present invention, within at least one section at least two reflector pairs are located and/or wherein within at least one section no reflector pair is located.

The refractive index change in the optical fiber to generate a reflector may be a change in the core and/or in the cladding or generally the cross-section profile (in gradient index fiber) in the longitudinal direction of the fiber (along the fiber). It may include a peak change, a periodic change (=FPG) along the fiber or others.

DETAILED DESCRIPTION OF ILLUSTRATED EMBODIMENTS

Embodiments of the present invention are now described with reference to the accompanying drawings. The invention is not restricted to the illustrated or described embodiments.

Figure 1:
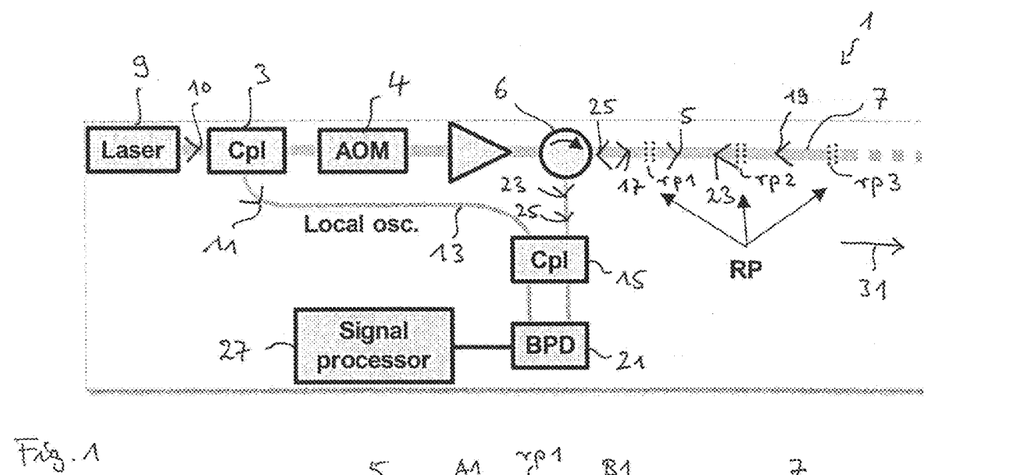
FIG. 1 schematically illustrates an arrangement for high rate fiber optical distributed acoustic sensing according to an embodiment of the present invention.

The arrangement 1 for high rate fiber optical distributed acoustic sensing illustrated in FIG. 1 comprises a light coupler 3 (e.g. including a modulator 4) which is configured to inject a first coherent light pattern 5 comprising first light into an optical cable 7, wherein the optical cable 7 has at least a first reflector pair rp1 and a second reflector pair rp2 arranged at different positions along the optical cable. The first coherent light as well as the second coherent light is generated by a laser source 9 and is propagated to the coupler 3. A reference portion 11 of the light 10 generated by the laser 9 is separated into a guiding fiber 13 and is propagated to a further coupler 15. The coupler 3 is further configured to inject a second coherent light pattern 17 into the optical cable 7, while first backscatter light 19 of the first light pattern 5 is propagating in the optical cable 7.

The arrangement 1 further comprises a detector 21 which is adapted to detect (e.g. via semi-transparent mirror 6) first reflected light 23 originating from reflection of the first light from the first reflector pair rp1 and/or the second reflector pair rp2. The detector 21 is further adapted to detect second reflected light 25 originating from reflection of the second light from the first reflector pair rp1 and/or the second reflector pair rp2.

The coupler 15 couples the first reflected light 23 and the second reflected light 25 with the portion 11 of the laser light 10 and interferes them in particular embodiments, such as local oscillator DAS. In other embodiments, the first reflected light 23 and the second reflected light 25 are not interfered with the original laser light 10 but are propagated to the detector 21.

An analysis module 27 (also referred to as signal processor) analyzes the detected intensities of the reflected lights 23, 25 to derive strain/stress/acoustic disturbance of the optical fiber 7 in the regions of the reflector pairs rp1, rp2, rp3, . . . .

The arrangement 1 is capable of carrying out a method of high rate fiber optical distributed acoustic sensing according to embodiments of the present invention. Thereby, the arrangement injects coherent light patterns with increased rate into the sensing fiber 7, where the reflector pairs rp1, rp2, rp3, . . . in the fiber are located in certain relation to the pulse rate (or period). The monitoring method enables that selected locations (i.e. the locations of the reflector pairs) with higher activities or of higher interest along the fiber like welding areas of a long structure or joints of a power cable can be monitored by the instrument more precisely (for example higher acoustic bandwidth, shorter measuring time) than a conventional DAS system. One inventive idea is based on Moiré (Alias) scanning of localized reflectors. The reflectors cause that backscatter only from locations of interest (where the reflectors are located) and not from regions outside the locations of interest is predominantly detected, because the Rayleigh backscatter is comparably low forming only background noise.

Figure 2:
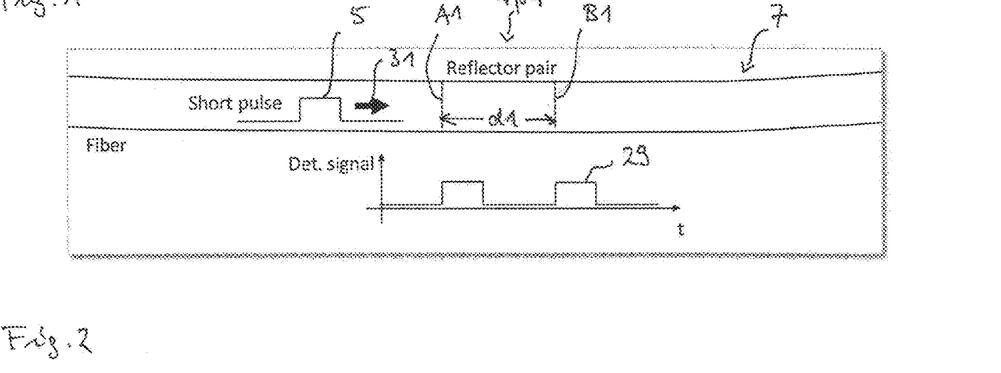
FIG. 2 schematically illustrates pulse propagation in an optical fiber as applied in embodiments according to the present invention.

FIG. 2 schematically illustrates one reflector pair rp1 within the optical fiber 7 in more detail including propagation of a first light pattern 5 and the detected signal 29. The first light pattern 5 propagates according to a forward direction 31 along the optical fiber, is first reflected by a first reflector A1 of the first reflector pair rp1 and then reflected at a second reflector B1 of the first reflector pair rp1. The detector detects the signal 29 including two peaks one peak resulting from reflection at the first reflector A1 and the other peak originating from reflection at the second reflector B1 of the first reflector pair rp1. In the illustrated embodiment in FIG. 2, the first light pattern 5 comprises a single pulse which has a width w1 which is smaller than an intra-distance d1 between the first reflector A1 and the second reflector B1 of the reflector pair rp1. In other embodiments, the first light pattern 5 may comprise more than one single pulse, such as a double pulse or a particular intensity profile and may have a width w1 greater than the intra-distance d1.

In the example illustrated in FIG. 2, the distance between both reflectors A1 and A2 is 10 m and the distance to the next (not illustrated) reflector pair is 500 m. The total length of the fiber 7 is 10 km including in total 20 reflector pairs, the pulse spacing, i.e. the distance between different pulses 5 is 475 m.

Figure 3:
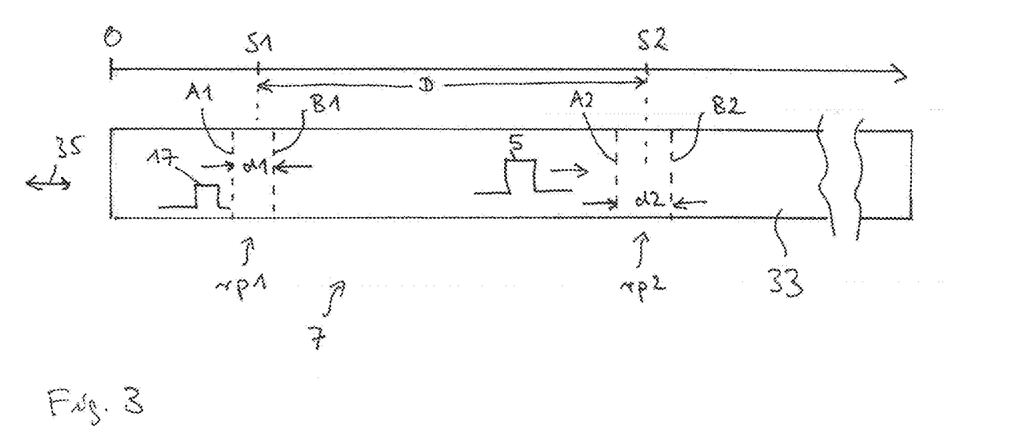
FIG. 3 schematically illustrates an optical fiber according to an embodiment of the present invention.

FIG. 3 schematically illustrates an optical cable 7 according to an embodiment of the present invention. The optical cable 7 includes at least one optical fiber 33 which is adapted to guide light along the longitudinal direction 35 of the optical fiber 33. The optical cable 7 further comprises at least two reflector pairs rp1 and rp2 arranged at different positions s1, s2, respectively, along the optical cable, wherein the first reflector pair rp1 comprises a first reflector A1 and a second reflector B1 spaced apart by a distance d1 in the longitudinal direction 35. The second reflector pair rp2 comprises a first reflector A2 and a second reflector B2 spaced apart by a distance d2 which may be the same or different from the intra-distance d1. The centers S1, S2 of the first reflector pair rp1 and the second reflector pair rp2 are spaced apart by the distance D which is different from the intra-distance d1 of the first reflector pair rp1 and also different from the intra-distance d2 of the second reflector pair rp2. In particular, $D > 2 \cdot \max(d1, d2)$. The distance D may even be at least 10 times or at least 50 times or at least 100 times greater than the largest intra-distance d1, d2.

In the regions of the optical fiber 33 between the reflector pairs rp1, rp2, the fiber has a refractive index being essentially homogeneous at least along the longitudinal direction 35 of the fiber. Thus, between reflectors of each reflector pair and between neighbouring reflector pairs, the fiber has at most reflectors for reflection from the forward direction to the backward direction having reflectivity smaller than 0.1 to 0.01 or smaller than 0.01 or smaller than 0.001 times a smallest reflectivity of all the reflectors A1, B1, A2, B2 of all reflector pairs in the optical cable 7.

According to an example a first light pattern 5 is injected at time tp1, a second light pattern 17 is injected at time tp2. The first light pattern 5 is reflected from the second reflector pair rp2 and is received at the detector at time $tp1 + 2 \cdot S2/c$. The second light pattern 17 is reflected from the first reflector pair rp1 and is received at the detector at time $tp2 + 2 \cdot S1/c$. The condition that both reflected light pattern are not received at the detector at the same time is (assuming very small pattern width and small intra-distances of reflectors):

$$tp1 + 2*S2/c \neq tp2 + 2*S1/c,$$

$$tp2 - tp1 \neq 2*(S2 - S1)/c$$

Figure 4:
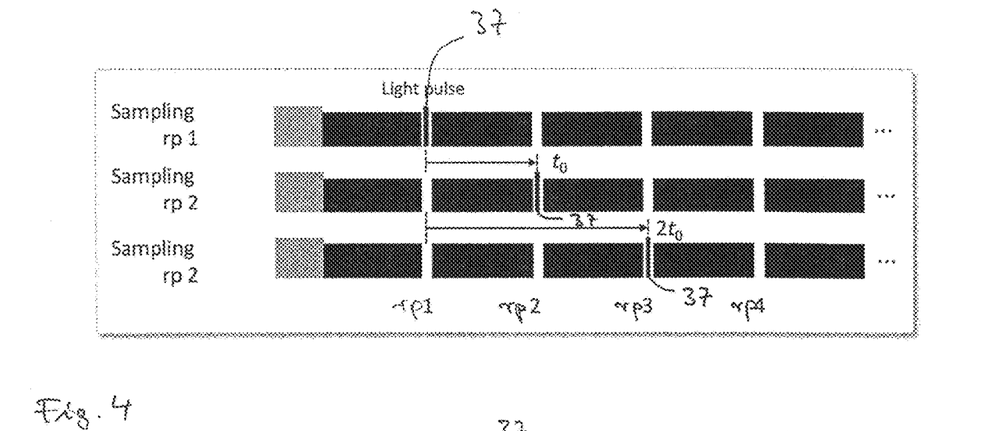
FIG. 4 schematically illustrates sampling according to a conventional method.
Figure 5:
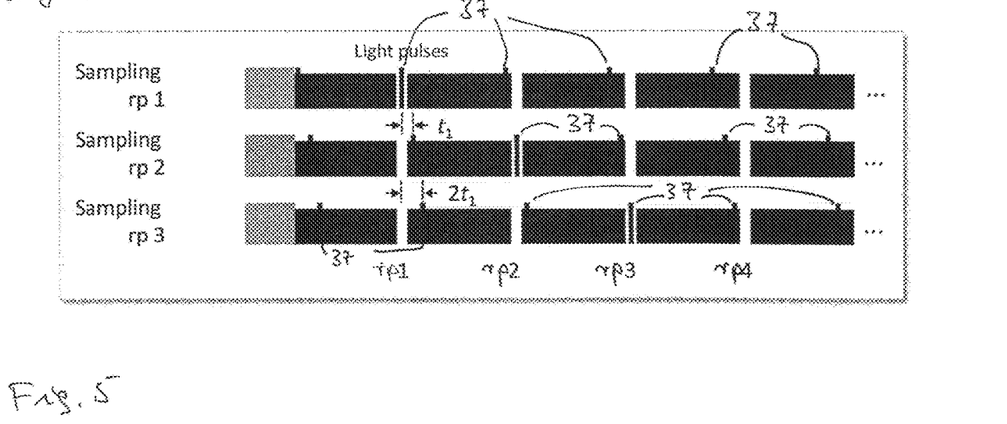
FIG. 5 schematically illustrates sampling according to an embodiment of the present invention.

FIGS. 4 and 5 schematically illustrate sampling or pulse scheme according to the prior art and according to embodiments of the present invention, respectively. In FIGS. 4 and 5, light pulses 37 are shown along with reflector pairs rp1, rp2, rp3, rp4. In the conventional DAS scheme illustrated in FIG. 4, it takes the time t0 for the pulse to sample one location to the next (and a relatively long time until the pulse reaches the fiber end and the next pulse samples respective location).

Figure 6:
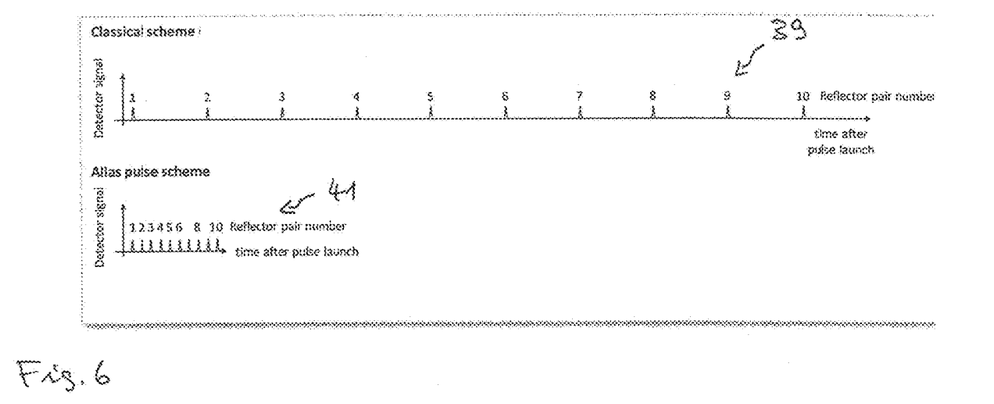
FIG. 6 compares a classical sampling and a sampling according to an embodiment of the present invention.

In the method according to an embodiment of the present invention, as illustrated in FIG. 5, sending pulses in a higher rate and having a special relation between pulse rate and reflector pair location, the time from one location to the next can be largely decreased from t0 to t1, as is illustrated in FIG. 5. In particular, in the example illustrated in FIG. 5, the pulse rate is 10 times higher with a 10 times shorter time from reflector pair to the next compared to the conventional method. Thereby, the time to sample all reflector pairs is largely reduced, as can be appreciated from FIG. 6. The diagram 39 in FIG. 6 illustrates the detector signal as observed in the conventional DAS method, wherein the pulse period is the time for one pulse to sample the whole fiber. The diagram 41 illustrates the detector signal as detected according to embodiments of the present invention, wherein the pulse period is the time for one Moiré (Alias) signal to sample the whole fiber. In both cases, all reflector pairs rp1, . . . , rp10 are measured during one pulse period, but in the method according to an embodiment of the present invention (scheme 41) the pulse period is 10 times shorter and each reflector is sampled 10 times more frequently.

Figure 7:
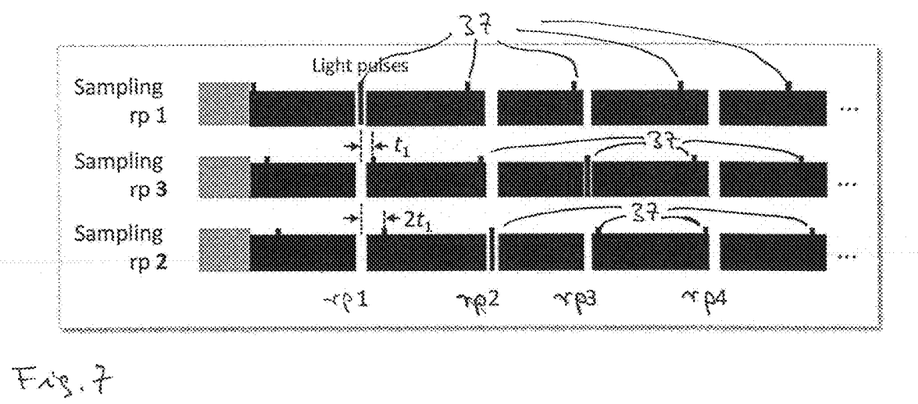
FIG. 7 schematically illustrates reflector pair spacing and sampling sequence as applied in embodiments of the present invention.
Figure 8:
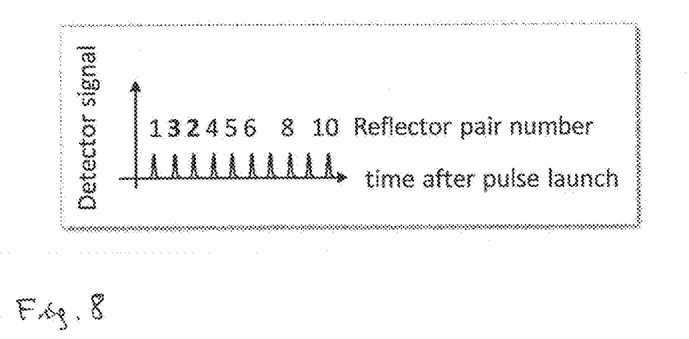
FIG. 8 illustrates the detector signal received for different times from different reflector pairs.

There are multiple possible relations of reflector pair location versus pulse spacing. Arbitrary sequences (orders) of reflector pair samplings can be realized. Also, the reflector pairs spacing is not necessarily equidistant, there are multiple possibilities, one of which is illustrated in FIGS. 7 and 8. Herein, again, light pulses are labelled as 37. At the first time point illustrated in the upper graph in FIG. 7, the first reflector pair rp1 is sampled. After an additional time t1, the third reflector pair rp3 is sampled. After 2*t1, the second reflector pair rp2 is sampled. The pulses 37 are generated having same distances between adjacent pulses. The distances between different reflector pairs or adjacent reflector pairs is however not constant. The FIG. 8 illustrates the detector signal illustrating the order of sampling of the different reflector pairs.

Signals from outside the locations of the reflector pairs (i.e. locations of interest) may also reach the detector due to Rayleigh scattering for example, however, the Rayleigh scattering is relatively weak, since the reflectors of the reflector pairs may much stronger reflect incoming light, such as at least 10 times stronger or even more preferably at least 100 times stronger. There may be an initial time to fill the fiber with the pulse sequence after turning on the measurement until reaching a stationary condition, especially about the time the first pulse after turn on reaches the sensor end.

Figure 9:
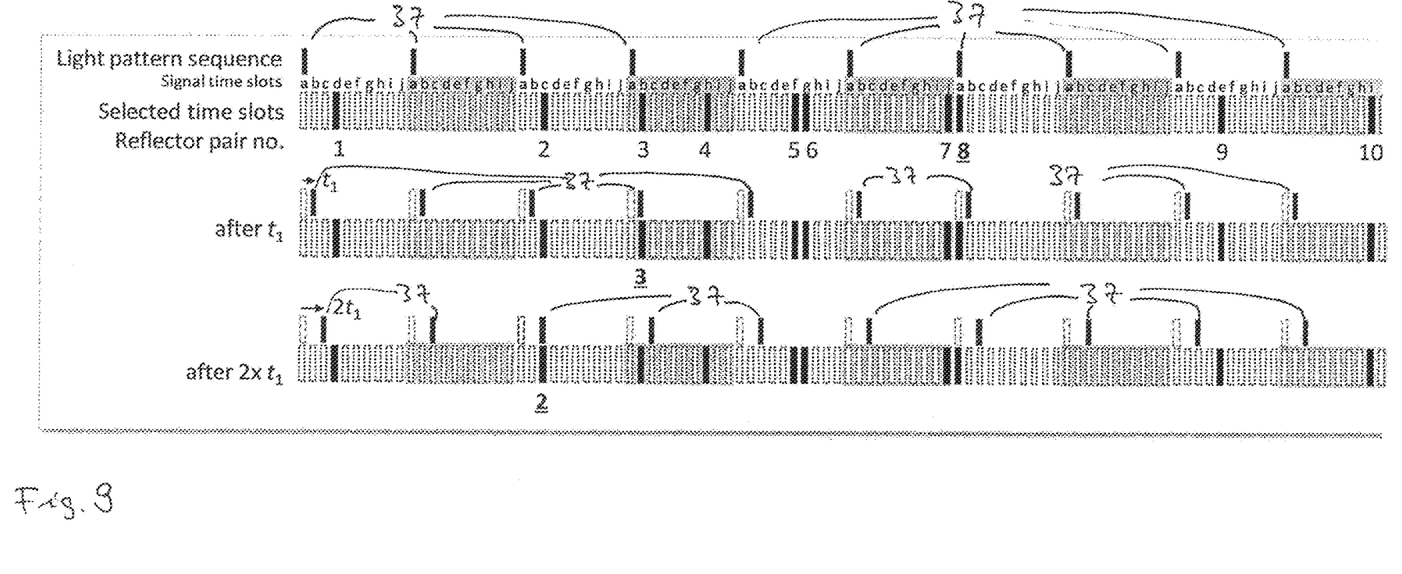
FIG. 9 schematically illustrates a reflector pair positioning procedure according to embodiments of the present invention.
Figure 10:
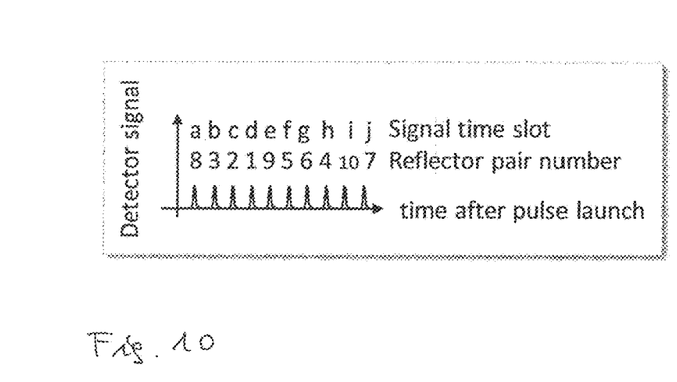
FIG. 10 schematically illustrates detector received signals from the fiber having reflector pairs positioned according to the method illustrated in FIG. 9.

FIGS. 9 and 10 illustrate a method for defining positions of reflector pairs according to an embodiment of the present invention. The reflector pairs rp1, . . . , rp10 are labelled in FIG. 9 with numbers 1 to 10. There may be a freedom where to locate reflector pairs which determine a corresponding order of reflector signals reaching the detector. For example, for an equidistant light pattern sequence, especially ten pulses (being simultaneously in the fiber), there may be any time ten potential locations able to create backscatter (or reflection), the locations where the ten pulses are at that time, as is illustrated in FIG. 9. These potential locations are denominated with one same letter out of "a" to "j". All pulses are considered physically identical in the sense that the backscatter (or reflection) from any reflector or reflector pair does not depend on by which of the pulses it is sampled or "read". If only one of these locations has a reflector (or reflector pair), the backscatter of only that one location reaches the detector at that time, allowing to assign this time of flight to this reflector or reflector pair. After a period, when the backscatter (or reflection) from respective location ends (depending on pulse size and reflector pair size), a next time slot, e.g. "b" starts which can be assigned to another location out of the ten potential locations with label "b".

Each of the three diagrams in FIG. 9 represents a particular time point. At the upper diagram, the reflector pair rp8 is sampled. After a time t1, the third reflector pair rp3 is sampled and after 2*t1, the second reflector pair rp2 is sampled. FIG. 10 illustrates the detector signal indicating the order of sampling of the reflector pairs. The light pattern sequence 37 comprises equidistant single pulses. The reflector pairs have different mutual distances from each other. The intra-distance between reflectors of all reflector pairs may be constant. Identification of the reflector number at a given time may be derived from the knowledge of the reflector locations with respect to the light pattern sequence.

The locations of the reflector pairs may be known from the manufacturing and/or installation process. The locations may also be measured with an OTDR or DAS, especially by measuring according to a conventional scheme. The locations may also be empirically determined by analyzing the response of the system on intentional stimulation of respective reflector pair.

Embodiments of the present invention may also apply a labelling of different light patterns. For example, for each wavelength sent into the fiber and separately detected (e.g. split/isolated by DWDM wavelength splitters), the Alias scheme may be operated, resulting in for example 100 times faster sampling of each reflector pair by using 10 wavelengths in parallel, each having ten light patterns in a manner as according to embodiments of the present invention explained above, in particular having simultaneously ten light patterns in the fiber.

A high rate DAS may be switched to a low rate DAS employing a conventional Rayleigh backscattering DAS, having however the reduced acoustic bandwidth. For example, it could be switched between both modes every few seconds, allowing with the same instrument to monitor reflector pairs with high acoustic bandwidth (for example ultrasonic detection and/or for better signal-to-noise ratio) and to monitor the complete fiber length (for example for digging detection or third-party interference monitoring) with lower acoustic bandwidth.

Figure 11:
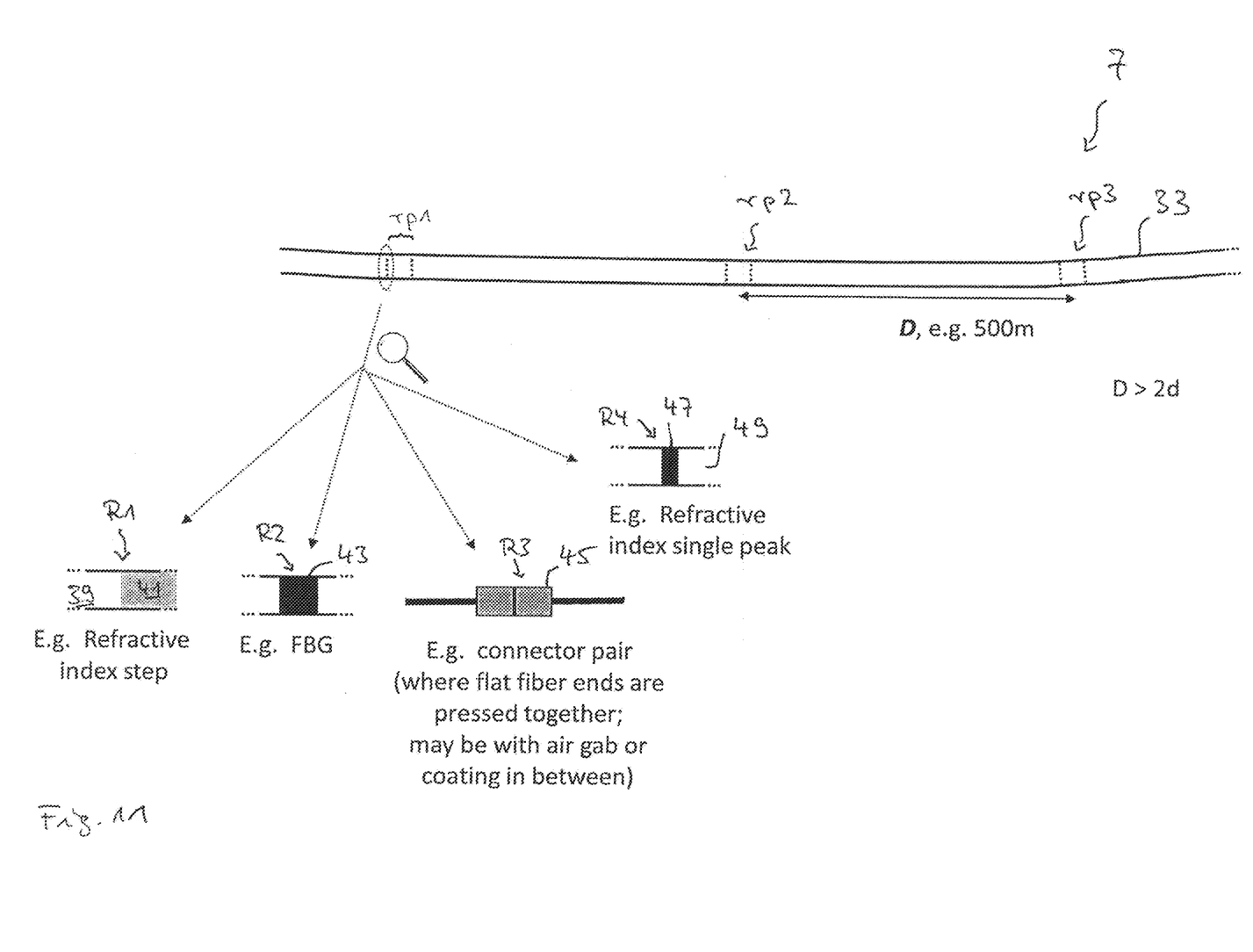
FIG. 11 schematically illustrates an optical cable comprising reflector pairs according to an embodiment of the present invention.

FIG. 11 illustrates an optical cable 7 according to an embodiment of the present invention. The optical cable comprises an optical fiber 33 having a number of reflector pairs rp1, rp2, rp3 inserted therein. The intra-distance d between different reflectors of one reflector pair may for example be between 1 m and 50 m, in particular around 10 m. The distance D between adjacent reflector pairs D may for example be between 300 m and 5 km, in particular between 300 m and 1 km, in particular around 500 m.

Each reflector of a reflector pair may be manufactured by different methods. For example, a reflector R1 is manufactured by providing a step in the refractive index from a first region 39 to a second region 41 having different refractive indices. Another type of reflector R2 comprises a fiber bragg grating 43. A still further reflector type R3 comprises a connector 45 connecting ends of two fiber portions. The ends may be generated by cutting or melting or breaking the fiber. The ends may be pressed together or there may be an air gap between the ends. Another type of reflector R4 comprises a region 47 where the refractive index is higher or lower than an overall refractive index in the region 49 of the fiber. Other methods for producing one or more reflectors may be possible.

Figure 12:
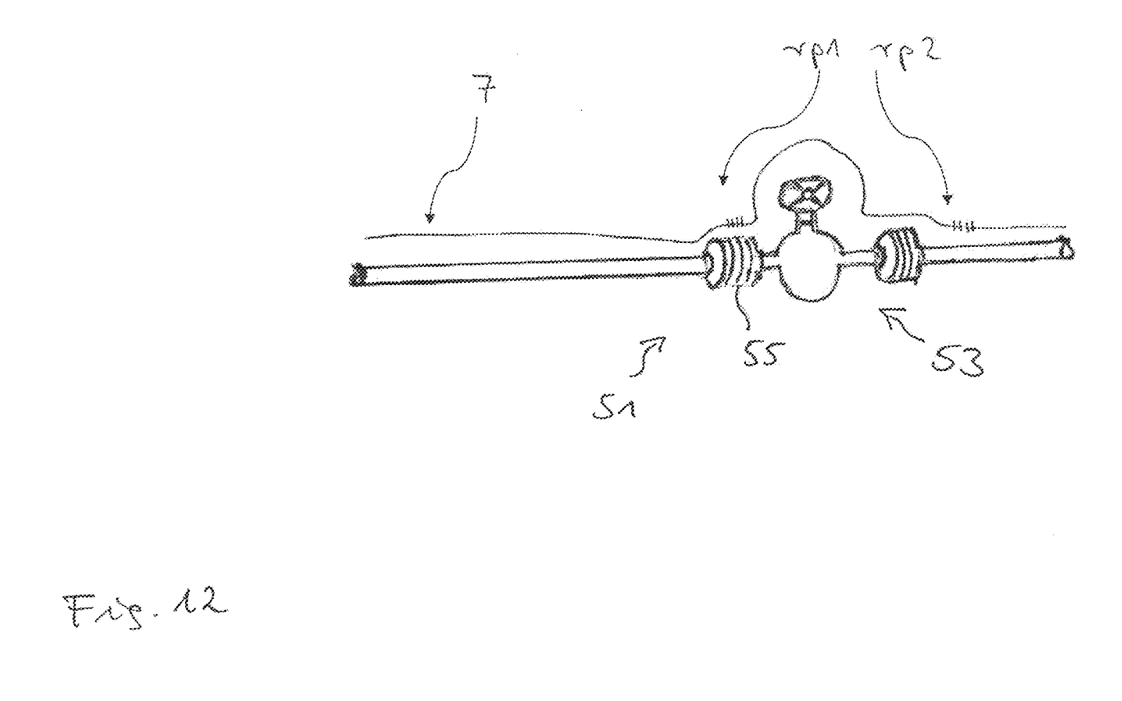
FIG. 12 schematically illustrates application of an acoustic sensing method using an optical cable according to an embodiment of the present invention.

FIG. 12 schematically illustrates application of an optical cable 7 for monitoring a pipeline 51, in particular a joint and valve system 53. The optical fiber 7 is arranged close to the pipeline 51, for example buried within the soil. The optical fiber comprises a reflector pair rp1 close to a joint 55 which is to be monitored at high rate. Further, the optical cable 7 comprises a second reflector pair rp2 at another region to be monitored.

Embodiments of the present invention may enable to monitor selected locations with higher activities or of higher interest along the fiber like welding points of a long structure or joints of a power cable more precisely, for example with a higher acoustic bandwidth, shorter measuring time, with less instrumental effort (for example no "labelling" of light pattern required, no multiple lasers, filters or frequency shifters required, no autocorrelation, decoding necessary, no "labelled" reflectors like FBGs with differing spectra) than conventional DAS systems. The reflectors may have a low reflectivity so that a larger fraction of the light is transmitted (to a next reflector) and the reflectivity is high enough to have a good signal against Rayleigh scattering signals.

According to embodiments the following definitions may apply separately or in any combination:

Reflector: generally, an element along the sensor fiber sending back a portion of the forward propagating light. Example: Fresnel reflection e.g. by non-perfect connection or splice; refractive index variation (e.g. a refractive index step), may be a single or multiple variation, including FBG; reflective elements within the fiber like reflective particles . . . .

Reflector intra-distance or reflector pair size: distance between both reflectors of a reflector pair, defines the RP's sensitive range or spatial resolution (means any strain event within that range can be detected, but not localized within that range). Example: use 5 m to monitor joints on power cables. In general, different RPs may have different sizes.

Reflectance of a reflector: High enough to give a good signal on the detector; may compete with Rayleigh backscatter; low enough to let enough light pass to read out the next reflector(s). Depending on pulse size and number of simultaneous pulses it may be e.g. 0.2%.

Light pattern period: repetition length of consecutive pattern in a periodic sequence of patterns; may be in the range of 10 m to 10 km, e.g. 470 m (about 4.7 µs in typical fiber) to monitor locations (reflector/pairs) in the order 500 m average distance.

Distance between reflector pairs (reflector pair distance): may be dependent on the distance between locations to be monitored, may be in the range of 10 m to 10 km, e.g. 500 m in average, similar (but different for Moiré/alias effect) to the light pattern period.

Light pattern: light that is modulated over time in a selection of intensity, frequency or polarization (e.g. single pulse, double pulses with same or different frequencies or pulse widths, multiple pulses with either different frequencies or different pulse widths, frequency chirped pulse, coded pulses e.g. by intensity or polarization or frequency coding, pulses with different polarization states).

'Slot' length: this determines the granularity of potential reflector locations; distance between two letters in FIG. 9. Slot length may be selected by pulse length+RP size+a tolerance (as RP target locations may have fabrication or installation tolerances, e.g. 5 m). Example: pulse length 5 m, RP size 5 m, tolerance+−2.5 m=>slot length 15 m.

Number of simultaneous pulses, number of monitored locations: Depends on the measurement requirement and results from the relation of light pattern period to reflector pair distances. It may be e.g. 20 locations monitoring 10 km fiber in 0.5 km intervals. Or it may be 40 locations monitoring 40 km fiber in 1 km intervals.

Sensor length (length of optical fiber): e.g. 100 m to 200 km, typically 5 km to 50 km.

The invention claimed is:

1. A method of high rate fiber optical distributed acoustic sensing, the method comprising:
   injecting a first coherent light pattern comprising first light into an optical cable, the optical cable having at least a first reflector pair and a second reflector pair arranged at different positions along the optical cable;
   injecting a second coherent light pattern comprising second light into the optical cable while first backscatter light of the first light pattern is propagating in the optical cable;
   detecting first reflected light originating from reflection of the first light pattern from at least one of the first reflector pair and the second reflector pair; and,
   at a different interval in time:
   detecting second reflected light originating from reflection of the second light pattern from at least one of the first reflector pair and the second reflector pair,
   wherein the first light pattern is injected substantially at a first point in time,
   wherein the second light pattern is injected substantially at a second point in time later than the first point in time,
   wherein a reflector pair distance between the first reflector pair and the second reflector pair is different from a difference between the second point in time and the first point in time multiplied by half of the speed of light in the optical cable.

2. The method according to claim 1,
   wherein the first light pattern and the second light pattern are injected according to a forward direction,
   wherein the first backscatter light, the first reflected light and the second reflected light propagate according to a backward direction being opposite to the forward direction.

3. The method according to claim 1,
   wherein a first reflected pattern originating from reflection of the first light pattern from the reflectors of at least one of the second reflector pair and the first reflector pair is received at the detector during a first reception time interval,
   a second reflected pattern originating from reflection of the second light pattern from the reflectors of at least one of the first reflector pair and the second reflector pair is received at the detector during a second reception time interval,
   wherein the first reception time interval does not overlap with the second reception time interval.

4. The method according to claim 1,
   wherein the second light has substantially a same characteristic as the first light comprising at least one of:
   the first light and the second light have a same wavelength or wavelength range, and
   the first light and the second light have a same polarisation state.

5. The method according to claim 1,
wherein the first light pattern and the second light pattern have substantially at least one of a same width and amplitude and intensity profile.

6. The method according to claim 1, further comprising:
injecting the first and second light patterns in a periodic fashion as a periodically repetitive light pattern such that, at any time, a reflected pattern originating from reflection from at most one reflector pair is received at the detector.

7. The method according to claim 1, further comprising:
analyzing the detected light, to determine in a first region of the optical fiber between the reflectors of the first reflector pair and in a second region of the optical fiber between the reflectors of the second reflector pair at least one of: strain, stress, acoustic disturbance, temperature, temperature gradient, temperature spatial and temporal change.

8. A method of fiber optical distributed acoustic sensing, the method comprising:
switching between a high rate fiber optical distributed acoustic sensing and a low rate fiber optical distributed acoustic sensing, the high rate fiber optical distributed acoustic sensing comprising:
injecting a first coherent light pattern comprising first light into an optical cable, the optical cable having at least a first reflector pair and a second reflector pair arranged at different positions along the optical cable;
injecting a second coherent light pattern comprising second light into the optical cable while first backscatter light of the first light pattern is propagating in the optical cable;
detecting first reflected light originating from reflection of the first light pattern from at least one of the first reflector pair and the second reflector pair; and,
at a different interval in time:
detecting second reflected light originating from reflection of the second light pattern from at least one of the first reflector pair and the second reflector pair;
the low rate fiber optical distributed acoustic sensing comprising:
injecting another first light pattern into the optical cable;
detecting light originating from Rayleigh backscattering of the other first light pattern from different portions along the optical cable including at least one portion between reflector pairs;
injecting another second light pattern into the optical cable after all the other first light pattern backscattered from all portions of the optical fiber has left the optical cable;
detecting light originating from Rayleigh backscattering of the other second light pattern from different portions along the optical cable including the at least one portion between reflector pairs.

9. An arrangement for high rate fiber optical distributed acoustic sensing, the arrangement comprising:
a light coupler configured:
to inject a first coherent light pattern comprising first light into an optical cable, the optical cable having at least a first reflector pair and a second reflector pair arranged at different positions along the optical cable,
to inject a second coherent light pattern comprising second light into the optical cable while at least a portion of first backscatter light of the first light pattern is propagating in the optical cable;

a detector adapted:
to detect first reflected light originating from reflection of the first light pattern from at least one of the first reflector pair and the second reflector pair; and, at a different interval in time:
to detect second reflected light originating from reflection of the second light pattern from at least one of the first reflector pair and the second reflector pair,
wherein the first light pattern is injected substantially at a first point in time,
wherein the second light pattern is injected substantially at a second point in time later than the first point in time,
wherein a reflector pair distance between the first reflector pair and the second reflector pair is different from a difference between the second point in time and the first point in time multiplied by half of the speed of light in the optical cable.

10. The arrangement according to claim 9, further including:
the optical cable, comprising:
at least one optical fiber adapted to guide light;
at least two reflector pairs including the first reflector pair and the second reflector pair arranged at the different positions along the optical cable, each reflector pair comprising two reflectors;
wherein a reflector intra-distance between the reflectors of at least one reflector pair is different from a reflector pair distance between a reflector pair and a next reflector pair of the at least two reflector pairs,
wherein between reflectors of each reflector pair and between neighboring reflector pairs the fiber has a refractive index being essentially homogeneous at least along a longitudinal direction of the fiber.

11. The arrangement according to claim 10,
wherein between reflectors of each reflector pair and between neighboring reflector pairs the fiber has at most reflectors for reflection from the forward direction to the backward direction having reflectivity smaller than 0.1 to 0.01 or smaller than 0.01 or smaller than 0.001 times a smallest reflectivity of the reflectors of the reflector pairs.

12. The arrangement according to claim 10, wherein positions of the reflector pairs are defined according to the following procedure:
defining a number of sections of the optical fiber adjacent to each other and spanning the length of the optical fiber;
defining, within each section, plural adjacent subsections spanning the entire section and being indexed for all sections with labels being unique for each relative position of the respective subsection within each section, the number of subsections being equal to the number of sections;
defining plural positions of the reflector pairs, the number of positions being equal to the number of sections, such that in any section a subsection with a particular label is occupied at most once.

13. The arrangement according to claim 12, wherein a reflector is realized by providing a refractive index change in the fiber at the reflector position,
wherein the refractive index is, over a region of the reflector, higher or lower than an overall refractive index of the fiber,
wherein outside the region of each reflector the fiber has the overall refractive index.

14. The arrangement according to claim 12,
wherein a reflector is realized by at least one of the following methods including:
introducing at least one impurity, performing a doping of a scattering particle, performing a doping of a reflective particle, applying UV-radiation, applying melting, applying radiation pattern treatment, modifying the structure, generating at least one cutting edge, providing an air gap, applying a connector to two connected portions of the fiber, apply a coating, apply a coated connector.

\* \* \* \* \*